United States Patent [19]

Shockley et al.

[11] Patent Number: 5,534,855
[45] Date of Patent: Jul. 9, 1996

[54] METHOD AND SYSTEM FOR CERTIFICATE BASED ALIAS DETECTION

[75] Inventors: William R. Shockley, Salinas, Calif.; George E. Gajnak, Harvard, Mass.

[73] Assignee: Digital Equipment Corporation, Maynard, Mass.

[21] Appl. No.: 358,040

[22] Filed: Dec. 15, 1994

Related U.S. Application Data

[63] Continuation of Ser. No. 916,818, Jul. 20, 1992, abandoned.

[51] Int. Cl.$^6$ ............................................. H04Q 1/00
[52] U.S. Cl. ........................ 340/825.300; 340/825.34; 380/25; 379/195; 379/188
[58] Field of Search ................ 340/825.31, 825.34, 340/825.3; 380/4, 25; 379/188, 194, 195

[56] References Cited

U.S. PATENT DOCUMENTS

| | | | |
|---|---|---|---|
| 4,310,720 | 1/1982 | Check | 340/825.31 |
| 4,669,487 | 6/1987 | Frieling | 340/825.30 |
| 4,780,821 | 10/1988 | Crossley | 340/825.31 |
| 4,839,640 | 6/1989 | Ozer | 340/825.31 |
| 5,056,141 | 10/1991 | Dyke | 340/825.31 |
| 5,173,939 | 12/1992 | Abadi | 340/825.31 |

FOREIGN PATENT DOCUMENTS

| | | | |
|---|---|---|---|
| 0262859 | 4/1988 | European Pat. Off. | G06F 1/00 |
| 0426595 | 11/1989 | European Pat. Off. | G06F 1/00 |
| 0456920 | 11/1991 | European Pat. Off. | G06F 1/00 |

OTHER PUBLICATIONS

"Enforced Separation of Roles in Multi-User Operating Sytem" IBM Technical Disclosure Bulletin, vol. 34, No. 7B, Dec. 1991, NY US pp. 120-122.

Primary Examiner—Brian Zimmerman
Attorney, Agent, or Firm—Kenneth F. Kozik

[57] ABSTRACT

A distributed computer system employs certificate based alias detection to ensure a policy of separation of duties. Biometric information is collected during computer user account creation that is converted to canonical form and digitized. This digitized canonical form, along with account data and authentication data, is included in the user's account information. Authorization to execute any task is validated at the time a request is made by comparison of the digitized canonical forms of biometric data of the user completing the request with those of the user initiating the request.

27 Claims, 4 Drawing Sheets

METHOD AND SYSTEM FOR CERTIFICATE BASED ALIAS DETECTION

This application is a continuation of application Ser. No. 07/916,818, filed Jul. 20, 1992 now abandoned.

BACKGROUND OF THE INVENTION

This invention relates to computer systems, and more particularly to a system for detecting computer user account aliases.

As it is known in the art, effective computer operating system security measures help prevent unauthorized access to and theft of proprietary software, software plans, and computer time. These measures can also protect equipment, software, and computer files from damage caused by tampering. The source of a security breach on a computer system can usually be traced to one of three categories: user irresponsibility, user probing, or user penetration.

User irresponsibility usually refers to situations where an authorized user purposely or accidently causes some noticeable damage. An example would be a computer user who is authorized to access certain computer files, makes an authorized copy of a key file to improperly transfer. This type of breach can be characterized as a breach of trust. There is little that a computer operating system can do to protect sites from this source of security failure, since the initial access to the file was completely authorized, and the breach occurred by the improper transfer of the fruits of the authorized access.

User probing refers to situations where a computer user obtains unauthorized access by exploiting insufficiently protected parts of the computer system. Probing typically reflects an exploration of top-level facilities to which a computer user has legitimate access to browse through the computer system.

User penetration refers to an attempt to bypass existing security controls by finding relatively obscure flaws in their implementation.

To guard against user probing and user penetration, computer systems typically include processes to authenticate the identity of a user. Authentication of a user identity in a computer system is the verification of a user's identity so that security policies can properly be applied to requests from that user. Authentication typically involves the examination of an individual's credentials, such as biometric information, encryptographic information, and so forth.

In medium- to large-scale distributed computer systems, it is often the case that a given computer user may well have access to the computer network via several different computer user accounts, each individually legitimate. For example, a computer user might have access to the computer across the network via an employee's computer system in the work place, and via a personal computer with a modem at home. Where separation of duties or similar policies are to be enforced by a computer network server, techniques should exist for the computer network server to determine whether or not two different computer requests are from distinct or different individuals. Where one individual can access two or more user accounts those accounts are known as alias accounts of that one individual.

An alias, therefore, is defined as an alternate identity for any individual who is held accountable for his/her actions. Where the possibility of alias computer user accounts exists, the straightforward comparison of authentication data, e.g., passwords, public keys, etc., is insufficient to prevent unwanted aliasing of a user, simply because there are typically no controls in effect to prevent one user from obtaining distinct user accounts containing potentially distinct authentication information.

One type of computer security required in many business and commercial applications has come to be called a policy for the separation of duties. This policy requires that, for critical business procedures, certain steps of that business procedure must be performed by different individuals. The purpose of this policy is to distribute responsibility for a transaction among several different people so that no one person, acting alone, can cause the action in question to occur. The presumption is that distinct or different individuals having different responsibilities will act as checks on each other.

An example of a policy for the separation of duties which may be encountered in every day life would be a personal safety deposit box. A bank usually requires a bank employee and the safety deposit owner to use two distinct keys and both to sign a log book in order for the safety deposit box owner to gain access to the safety deposit box. Requiring two keys is referred to as access control. Requiring both individuals to sign a log is referred to as audit control. The bank policy is that the owner and bank employee must be two distinct or different individuals. Another example would be when a business employee hands in an expense form and would like to be issued a company check for those expenses. Corporate policy would require that the expense check may not be signed and authorized by the same person. These two examples illustrate that the principle of separation of duties is widely required for manual systems.

Several approaches have been advanced in the past for enforcing separation of duties policies. The most common approach for enforcement of separation of duties in automated computer systems has been for a security administrator to define distinct groups or roles and to manually ensure that the assignment of the individuals to critical groups or roles does not overlap. One problem with this approach is that it does not prevent a threat from a given individual who may have access to a computer system from two distinct accounts.

Known approaches to the authentication and identification of users by user account have generally presupposed that user account aliasing is prevented by the use of operational or procedural rules. Approaches for enforcing a separation of duties policy have assumed that aliasing does not occur, and that authenticatible user account identities are therefore sufficient to identify individuals as well. The problem with this approach is that the premise that alias accounts do not exist particularly in large computer systems is generally incorrect.

Moreover, preventing account aliasing becomes more and more impracticable as networks grow larger and larger. Even if identifying information unique to an individual, such as biometric information, is obtained when a new account is created, in order to associate that new user account with any other user account that may exist for that individual on the network, an exhaustive search over every user account already in the system would have to be performed. Such a search is costly even for relatively small computer networks, and is effectively impossible for large computer networks.

One further type of user authentication uses biometric reader information which is fed to the computer system during login. Biometric information is provided from a biometric reader at each login point or station. A biometric reader can typically detect unique information or characteristics of an individual such as eye scans, thumbprints, DNA sampling, and so forth. While the use of biometric information for purposes of user authentication is often performed, it is generally expensive because biometric readers are needed at every login point. In addition, if biometric information is ever disclosed, there is no way to undo the damage. For these reasons, continued use of encryptographic information such as passwords and/or smart cards have usually been indicated as a better alternative for authentication than biometrics.

SUMMARY OF THE INVENTION

A method of performing alias detection on a computer system, includes the steps of storing in respective user accounts identification information uniquely characterizing each of a plurality of computer users, initiating execution of a computer system resource upon a first request from a first user account, processing a second request for execution using a second user account, comparing said identification information stored in said second user account used during said second request with said identification information in said first user account, and determining whether said first user account and said second user account used in said second request are aliases. With such an arrangement, an alias detection technique that is performed at the time of execution of a computer resource using a second request for user account information is provided. Such a technique can be used for example to control access to restricted computer resources, monitor and control the existence of alias accounts on the computer system, and implement a separation of duties policy on resources of the computer system.

In accordance with a further aspect of the present invention, a method of operating a distributed computer system includes the steps of storing in respective user accounts identification information uniquely characterizing each of a plurality of computer users, storing a list of selected user accounts in an authorization store, initiating execution of a computer system resources access program upon request from a user account, and processing the request from the user account to authorize access to a plurality of computer system resources by comparing the identification information stored in the user account and in the list of authorized user accounts, and determining whether the user account is an alias of any of the list of authorized user accounts. With such an arrangement, alias detection is determined at the time that a user attempts to gain access to a computer system resource.

In accordance with a further aspect of the present invention, a method of operating a distributed computer system includes the steps of storing in respective user accounts identification information uniquely characterizing each of a plurality of computer users, and initiating execution of a stage of a selected transaction program having a plurality of stages upon request from a first user account. The method further comprises the steps of processing a request from a second user account to authorize execution of a subsequent stage of the selected transaction program by comparing the identification information stored in the first user account and in the second user account, and determining whether the second user account is an alias of the first user account. With such an arrangement, alias detection is determined at the time that a subsequent user attempts to complete the selected transaction. By not assuming that login authentication also uniquely identifies a user, who may, in fact, have alias accounts, this arrangement provides for detection of aliases at the point of policy application without ever requiring an exhaustive search throughout the network for potentially aliased accounts. The present invention does not assume that user account aliasing is prevented. Rather, it assumes that alias accounts may be freely created, and uses data that uniquely identifies the owner of each account to detect the existence of unwanted aliasing at the point in time just before execution of a protected activity is to commence.

In accordance with a further aspect of the present invention, a system of operating a distributed computer system to implement alias detection is provided, including storing in respective user accounts, digitally-signed account certificates including identification information uniquely characterizing each of a plurality of computer users, initiating execution of one stage of a selected transaction program having a plurality of stages from a store of application programs on the computer system upon request from a first user account, processing a request from a second user account to authorize execution of a subsequent stage of the selected transaction program by comparing the identification information included in account certificates stored in the first user account and in the second user account, determining whether the second user account is an alias of the first user account, and allowing the processing request to execute the subsequent stage of the selected transaction program if the second user account is not an alias of the first user account. With such an arrangement a computer security system which uses a combination of biometric and cryptographic techniques is provided. Specifically it provides a system for supporting a separation of duties policy that is not dependent on a single authority for registering accounts, or rigorous account administration to segregate accounts into different non-overlapping groups or roles (i.e., static enforcement of separation of duties), or preventing multiple accounts for an individual. Such a system embodying the invention can support dynamic enforcement of separation of duties by allowing an individual to assume multiple roles if need be, and ensure that within the context of a given business function, the individual has not assumed conflicting roles. It achieves this by the use of digitized biometric data or other uniquely identifying data to determine if different accounts are used by a single individual, i.e., are aliases of each other.

BRIEF DESCRIPTION OF THE DRAWINGS

The novel features believed characteristic of the invention are set forth in the appended claims. The invention itself, however, as well as other features and advantages thereof, will be best understood by reference to the detailed description of specific embodiments which follows, when read in conjunction with the accompanying drawings, wherein:

DESCRIPTION OF THE PREFERRED EMBODIMENTS

Figure 1:
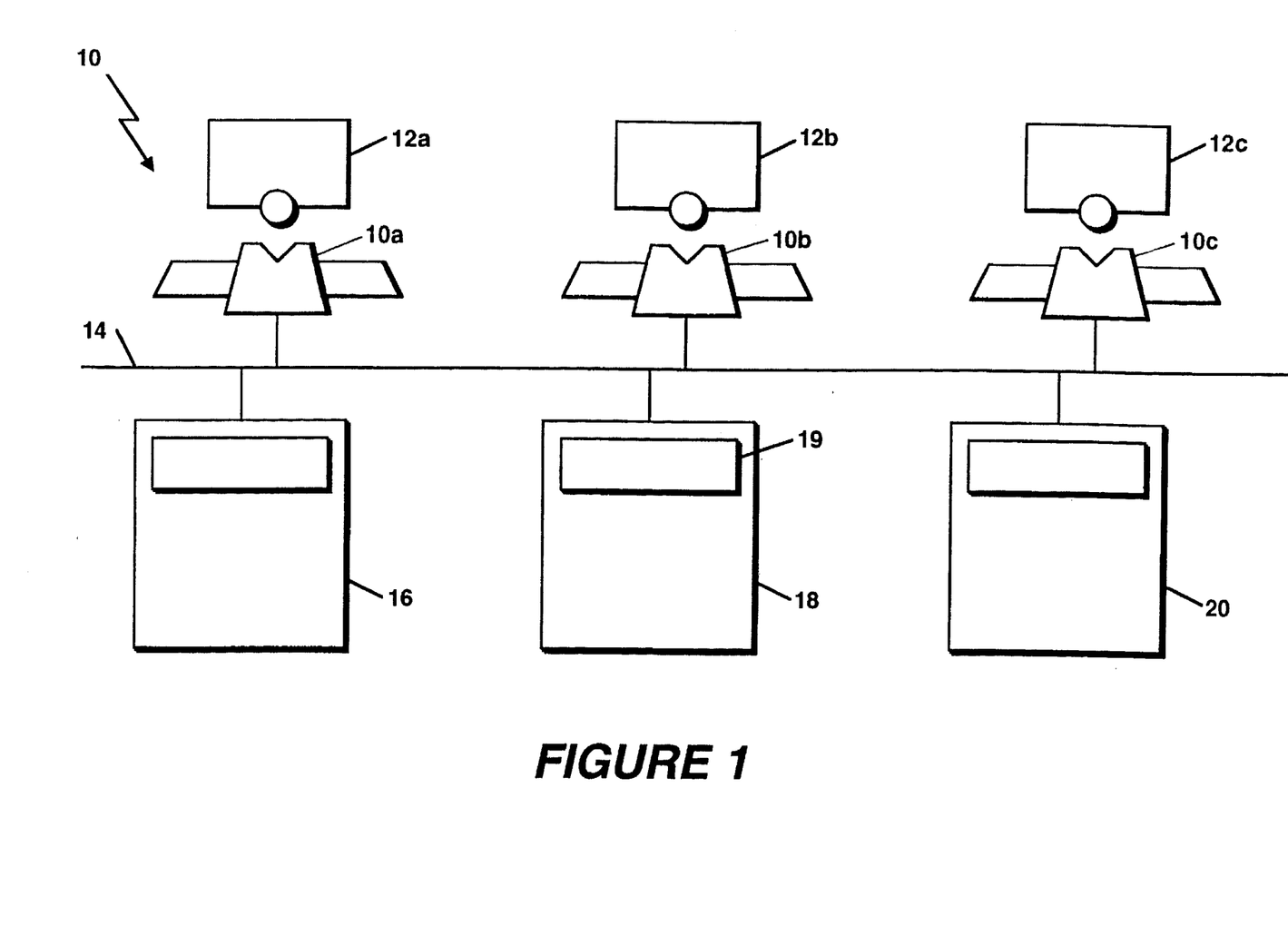
FIG. 1 is a diagram in block form of a distributed computer system which may be used to implement certificate-based alias detection according to one embodiment of the invention.

Referring now to FIG. 1, a computer system 10 is depicted with access available to individual users 10a–10c. Each individual user 10a–10c has a workstation 12a–12c connected to a local area network 14. The workstations 12a–12c provide each individual user 10a–10c access to a set of applications to perform his/her duties. The applications reside on an application server system 16 connected to the local area network 14.

The application server system 16 is a computer system which contains a set of application programs (hereinafter "applications") that can also be accessed by other computer users (not shown) via the local area network 14. Each individual user 10a–10c is identified by one or more accounts maintained in a name service program 19 on a name server system 18.

The name server system 18 is a computer system containing name service software 19 and accessed by any computer user via the local area network 14. The name service software 19 allows the names of network applications, systems, and other network-accessible objects to be independent of their physical location in the local area network 14. For example, a unique name will be stored in the name service program 19 on the name server system 18 to allow individual users 10a–10c to execute a unique application on an application server system 16.

In the name server system 18, each individual user 10a–10c will have a personal account, and one or more "special" accounts; each account, whether personal or special, has a respective account identification to enable each individual user 10a–10c to log on to the computer system 10 to use a particular application identified in the name server system 18. Each "special account" corresponds to a specific job function, e.g., organizational role. An individual user logged in under such a specialized account is able to perform those applications particular to the corresponding job function.

Figure 2:
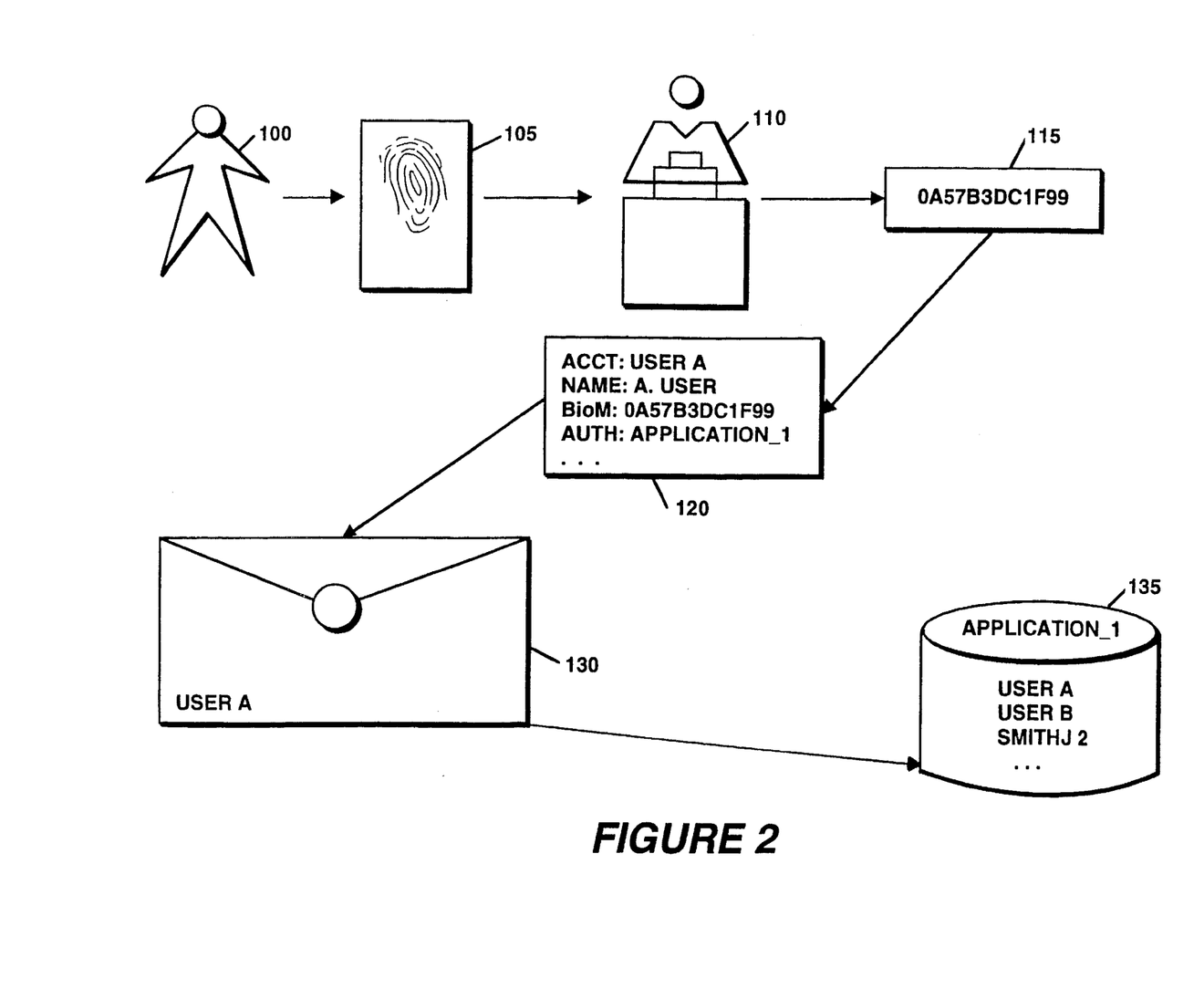
FIG. 2 is a diagram in block form of how an account certificate incorporating certificate-alias detection data is created.

Referring now to FIG. 2, an applicant 100 supplies biometric information 105 to a registrar 110 as part of the processing of an account. All accounts in the computer system 10 are administered by the account registrar 110, an entity having its own identity, with responsibility for account administration for some enterprise. During the production or modification of an account, the registrar 110 captures an applicant's biometric information 105. The system uses a public key encryption technology for authentication to provide authentication data. The authentication data will be associated with the account for use in login authentication and will be the public key of a public key/private key pair.

The registrar 110 causes a new public/private key pair to be generated. The private key is issued to the user (typically in the form of stored information in some device 115 such as a passcard) while the public key for the account is stored along with other account information in a so-called "certificate" for that account. The biometric data 105 supplied by the applicant 100 is preferably integrity locked into the certificate along with the authentication data (e.g. user's public key) and other security-critical information which may be needed by the system (e.g., such as the user's authorized role).

The integrity-locked digitized canonical biometric data is hereinafter referred to as "certificate-based alias detection data (CBAD)." The registrar integrity locks the certificate by appending a digital signature to it. A digital signature in its simplest form is simply an encrypted copy of the certificate that is encrypted using the registrar's assigned private key (which is known only to the registrar 110 and the registrar's work station). The digital signature is used with the data to be "integrity-locked" by using the signature to provide an encryptographic checksum or other appropriate code. Appending the digital signature provides "integrity-locked" or digitally signed account/authentication/certificate-based alias detection data 120 where it is stored in the name service program 19. The above mentioned public key cryptographic type techniques are used to ensure that tampering of account/authentication/certificate-based alias detection data is detectable.

At a later time, any entity may verify that the account certificate 130 was, indeed, signed by the registrar 110 by decrypting the digital signature using the registrar's 110 public key (which is known throughout the system) and comparing the results with an associated plaintext certificate of the decrypted digital signature. The plaintext certificate is a decrypted version of the digital signature. If they are identical, the entity using the account certificate is confident that neither the plaintext nor encrypted versions of the account certificate were modified after they were created or modified by the registrar 110, and that the account certificate data did originate from the registrar's workstation.

When an individual user logs on to a workstation, the individual user provides information (such as the user's name) that is used by the local operating system to locate and fetch an account certificate from the name service program 19 as the first step in authenticating, or confirming the identity, of the individual user. The local operating system then validates the account certificate's digital signature using the registrar's public key. If the account certificate is valid, the public key assigned to that account by the registrar 110 is known.

The individual user trying to log in then presents a digitally signed "login delegation certificate" to the workstation. A login delegation certificate is what the user sends to the local operating system to be authenticated. (Typically, this would be done by a smartcard issued to the individual user by the registrar 110, containing the individual user's personal private key.) The operating system validates the login delegation certificate by decrypting it using the public key it obtained from the account certificate. If the validation is successful, the operating system knows that the public key obtained from the account certificate matches the private key in the possession of the individual user trying to log on, and is justified in assigning to that individual user any rights or privileges associated with the account. At no time during the authentication process is the CBAD data in the account certificate used. Since CBAD data does not determine the success or failure of a login authentication, there is no compromise to the integrity of the login authentication system if CBAD data is public.

In order to invoke a remote application (e.g., from the application server system 16) to be executed on behalf of, or at the request of, a properly authenticated local user, the workstation operating system generates a so-called remote delegation certificate for the request by appending to the request the individual user's login delegation certificate and digitally signing it using the workstation's private key. A remote delegation certificate is what the local computer operating system sends to the applications server system 15 to obtain services on behalf of the individual user. The application server system 16 can then verify that the remote delegation certificate came from the workstation (by applying the workstations public key to the signature), and, if this is successful, can reauthenticate the identity of the individual user by verifying the user's signature on the included remote delegation certificate using the user's assigned public key. Provided that both of these tests are successful, the application server system 16 knows that the included request emanated from the workstation claimed, acting on behalf of the user account claimed, and/or can use this information to determine whether or not the request should be honored. Since CBAD-data is not used to determine the validity of a remote delegation certificate, there is no compromise to the remote request authentication system if CBAD data is public.

Each user also has an associated account certificate 130. A user certificate 130 is a data structure, generated by the operating system, that includes user information 120 and CBAD data, if it exists, which are bound together. The binding of these data can be provided by using a cryptographic checksum. The checksum ensures that any corruption of the user information 120 is detectable by the system. The encryption uses the registrar's 110 private key or encryption code, thus generating a digital signature that uniquely identifies the source of the account information as the registrar 110. The account certificate 130 is then posted by the operating system to the name service system 135. Thus, execution of selected tasks can be restricted to selected users or groups of users.

During user logon the computer system 10 collects user certificate information 130, as mentioned above to produce a validation credential for the particular user. Such validation credentials are used by the computer system 10 to identify each user and to determine whether the identified user has the necessary privileges to execute a particular application. At this juncture the computer system 10 is using the account certificate information 130 to produce a validation credential if the particular user has been authorized to execute the particular identified transaction. Thus, to produce validation credentials, to determine which users may access certain computer applications, individual account/authentication/certificate-based alias detection data is collected by the registrar 110. Such information includes both the conventional user information such as the user's name, mentioned above, authentication data assigned to, or obtained from, the user, and digitized canonical biometric data (BioM), here referred to as Certificate-Based Alias Detection Data (CBAD), as mentioned above. The system may include accounts which include CBAD data and accounts which do not include CBAD data. The effect of the presence or absence of CBAD data will be described below.

Although an alias detection system to be described below is here discussed in the context of a single computer system, it should be understood that this alias detection can be implemented on a multi-computer system joined together via large computer networks, such as wide area networks. This allows computer users located throughout the large computer network to execute a common application.

As illustrated in FIG. 2, the CBAD data is captured as part of the account operation and stored for later use when a separation of duties policy needs to be enforced (as will be fully described below). Here, it is used for determining user distinctness and detecting alias accounts. This use permits the enforcement of a separation of duties policy that is resistant to attacks by unscrupulous users who assume multiple everyday identities. It also allows for enforcement of separation of duties policy even with systems using lax administration that do not minimize the number of accounts granted to an individual user. It also facilitates creating separate accounts for individuals for specialized purposes. Such approaches resist privilege accumulation, since users log in only with specific sets of privileges, rather than with the accumulated total of all possible privileges which they are permitted to exercise.

Figure 3:
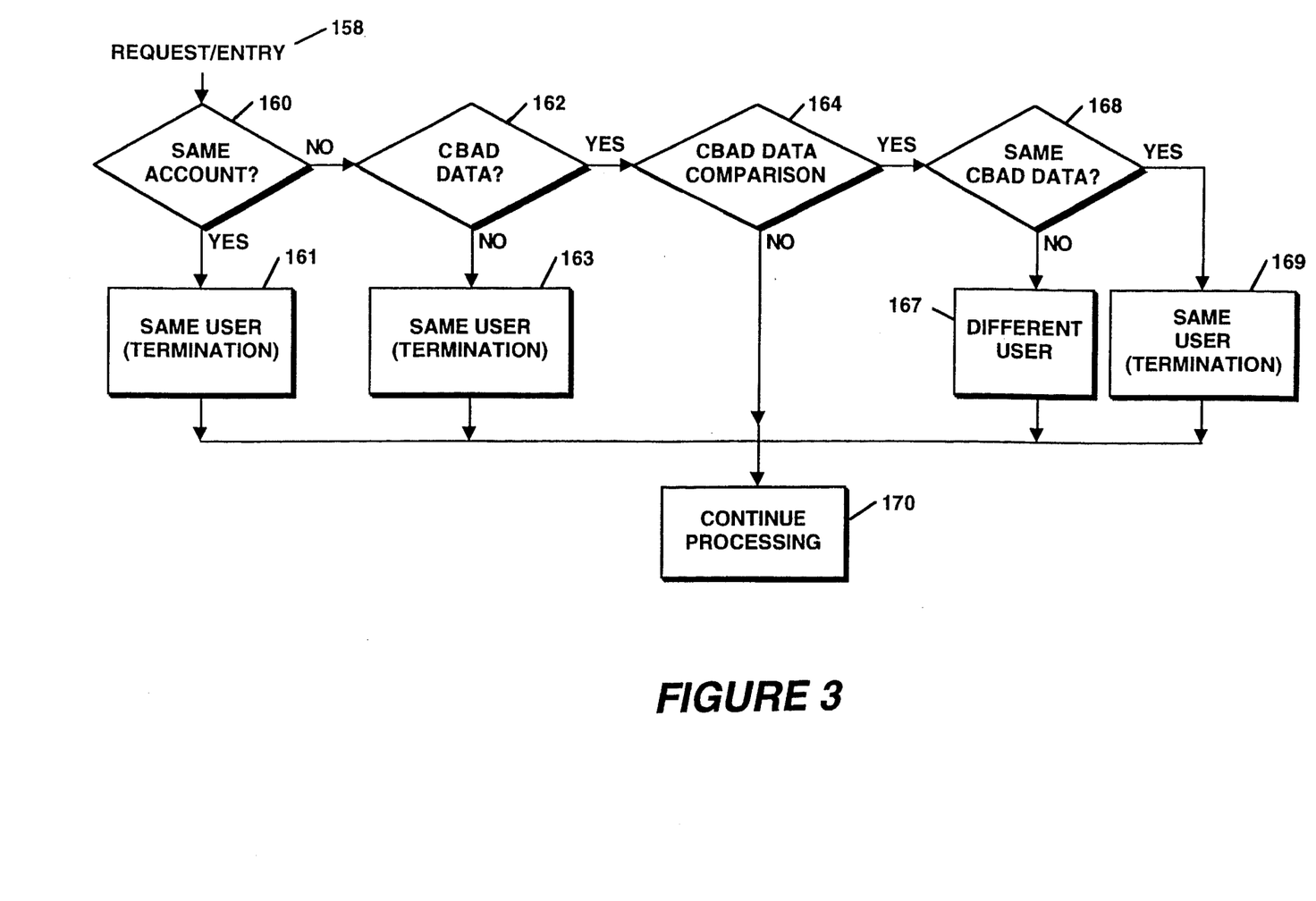
FIG. 3 is a diagram in block form of how certificate-based alias detection is utilized in the present invention.

Referring now to FIG. 3, the steps involved in certificate-based alias detection which is invoked when a particular unit of processing executes on behalf of more than one user are shown. Certificate based alias detection is provided in the operating platform (e.g., operating system, transaction monitor) of the computer system 10 in FIG. 1.

The computer system 10 produces a validation credential for the associated user from the account certificate. As previously mentioned, a validation credential is an integrity-sealed (i.e., digitally signed) packet that logically bound together the identity of an authenticated user, a request made on behalf of that user, and the CBAD data, if any, for the user. An authenticated user is a user having predetermined authorization to execute the particular application. The predetermined authorization is granted to the user by a system manager or registrar who has the necessary privileges to do so. Binding of the integrity-sealed packet is provided by the operating system appending the user information with the application transaction. Prior to executing the unit of processing, however, the security policy for that unit of processing is examined. If necessary to protect security, certificate based alias detection is triggered by an appropriate statement in the security policy (38 in FIG. 4) for the specific application transaction which the user chooses to execute.

The general manner in which user data and alias detection data may be used in a data processing system in the context of the present invention will now be explained. It will be assumed that the transaction to be described, by way of example, requires an application initiation request and an application approval entry to be inputted into the system by different permitted users.

As shown in FIG. 3, the transaction is initiated at step 158 when an individual user who has logged on to the system, and submits a data processing application initiation request. A review or an approval entry then is submitted at step 158 before further processing of the transaction can proceed.

At step 160 the digital signature on the delegation certificate for the user initiation request and the digital signature on the delegation certificate for the approval request are first individually validated. If this step is successful, the application server system 16 knows that neither certificate has been tampered with and knows the assigned public keys for the individual user accounts associated with the pair of requests, i.e. the account on whose behalf the initiation request was made and the account on whose behalf the approval request was made. If these two public keys are identical, then both requests were made on behalf of the same account, implying that both requests were made on behalf of the single user assigned to that account. In this event, no further processing of the transaction occurs and the approval entry is rejected.

If the identification step results in identification of different user accounts, the two sets of account credentials are checked for the presence of CBAD data at step 162. Checking that the provided CBAD data for the request is, indeed exactly the CBAD data the registrar 110 captured is implicit in the process of the applications server system 16 obtaining and validating the account certificate. The CBAD data and the authenticating data are bound together into an account certificate by the registrar 110.

As previously mentioned, the computer platform is responsible for validating the account certificate that is obtained as part of the login before proceeding with user authentication. In addition, the computer platform, through its operating system, is responsible for binding a request to execute a transaction to the account certificate and sealing this information to provide an integrity-sealed account certificates. The computer platform is responsible for validating this account certificate before using it. A request may fail simply because either the authenticated user and/or the authenticated computer platform are not authorized for a particular action. Only if the computer platform validates the credential and the request is authorized for the particular action are CBAD checks, if any, made. If either set of account credentials does not contain CBAD data, it is assumed at step 163 that both sets of account credentials are associated with the same user and the approval entry is rejected and the process terminated. If both sets of account credentials contain CBAD data, then the digitized biometric data present in each set of account credentials are compared at step 164.

If the compared digitized biometric data are within a predetermined range of similarity, the two sets of account credentials are presumed at step 169 to belong to the same user, and the approval entry is rejected and the process terminated. A range of similarity rather than identicalness between the two sets of account credentials is caused principally by normal variations and fluctuations in biometric data received from a given user. Thus the range or tolerance permitted in the similarity should be narrow enough to prevent overlap between truly different users, but should be broad enough to encompass normal expected variations in the same user's biometric information. If the two sets of account credentials are determined to be different at step 168, it is presumed at step 167 that the application initiation request and the approval entry originate from different users and this comparison result is reported to step 170 for further processing of the transaction.

If the application initiation request and the approval entry request are from different individuals, the user initiating the approval entry request is allowed to approve this application request if authorized to do so in an access control list associated with the program, described below.

An example of the present invention will be described with reference to a typical computer based expense reporting and approval procedure in an office environment. Any individual is able to fill out and submit an expense report. The expense report must be approved before it is forwarded to disbursements, where a reimbursement check is prepared. The essential separation of duties requirement is that no individual can approve his/her own expense report.

Referring again to FIG. 1, each individual user 10a–10c is able to execute a personal expense report application stored in the name service system 18 when logged in under his/her personal account. The expense report application displays a form at a workstation for the user to fill out. A user may then submit an expense report. A submission transaction causes an expense report to be posted to a queue on a queue server system 20 connected to the local area network 14, where it is retained for review. A queue server system 20 is a computer system containing various queues, e.g., print queues, batch queues, etc., that can be accessed by any individual computer user 10a–10c via the local area network 14.

One or more selected individuals (10b, for example) are given "management accounts", i.e, such an individual is authorized to review and either approve or reject expense reports. This is a "special account" as mentioned above in connection with the previous discussion. A rejection returns the expense report to the originator, an approval forwards the report to a pending disbursements queue located on the queue server system 20. An individual in disbursements (10c, for example) can then generate a check to clear the approved expense report. The "generate check" transaction not only produces the check, but files the expense report in an archive and notifies the originator that his/her expense report has been processed and a check is issued.

Continuing with FIG. 1, individual user 10a on workstation 12a initiates via local area network 14 the expense report application which resides on application server system 16. The result is an unapproved expense report that is posted by the application via the local area network 14 to queue server system 20. Subsequently, a second individual user 10b on workstation 12b attempts to review and approve the expense report on queue server system 20 via local area network 14 by executing the expense report application on application server system 16. The request to approve the expense report created/initiated by individual user 10a triggers the certificate based alias detection method. The location and operation of the certificate based alias detection is more fully described below.

Figure 4:
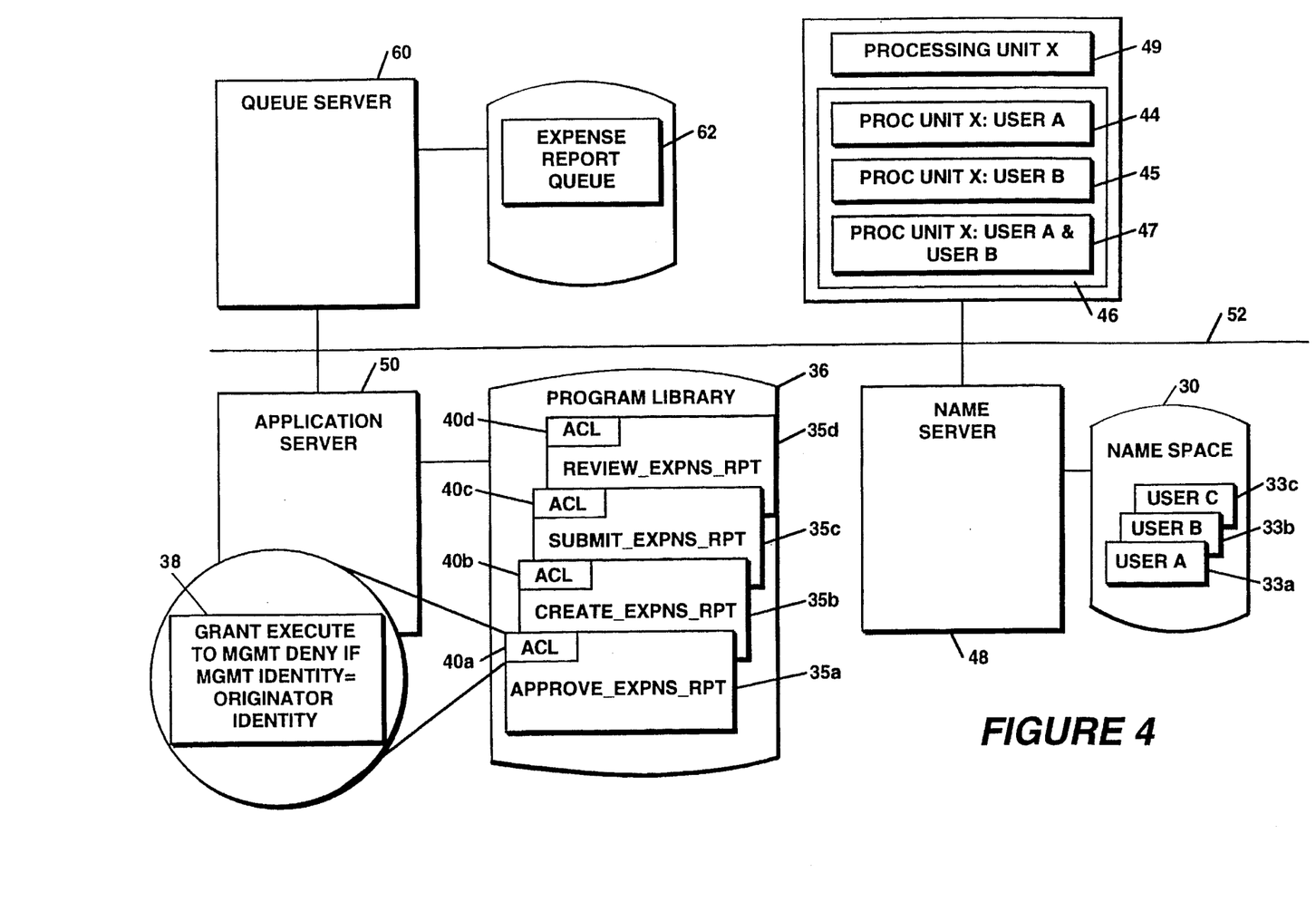
FIG. 4 is a diagram in block form of an example system incorporating certificate-based alias detection.

FIG. 4 illustrates the general data structures to support separation of duties using certificate based alias detection (CBAD). A name service database 30 in name server system 48 contains account certificates for individual user accounts (33a–c). Each account certificate (33a–c), which has been produced as previously described, contains relevant information about each individual, including digitally-signed, digitized canonical biometric data for the individual; this is referred to as CBAD data, fully described with reference to FIG. 2. The accounts 33a–c also contain the signature of the account registry, also described previously. An individual's personal and "special" accounts will contain the same digitized canonical biometric data, i.e., CBAD data, because they represent two or more accounts owned by the same individual user. Accounts for different individual users will be identified by the fact that the CBAD data for each of the individual users is distinct.

Application system programs 35a–d, respectively, reside in a program library 36 in application server system 50. This enables any individual user on the local area network 52 access to the program library 36. Each type of transaction, such as "create expense report", "submit expense report", "approve expense report," etc., has a corresponding application system program 35a–c, respectively, residing in the program library 36 and stored in application server system 50. Associated with each such transaction program, there is a security policy, which states that individuals or groups of individuals are able to execute or not execute the corresponding transaction. For example, a security policy 38 is contained in an access control list (ACL) 40a associated with transaction program 35a. An ACL is a common mechanism for storing access policies in many computer operating systems. The security policy and its trigger is provided as an extension to the access policy language. The security policy is added to a particular access policy storage mechanism of the platform computer system. The access control monitor of the operating system platform expresses the access constraint, stores the access constraint within the access policy, and provides the capability to invoke the appropriate method at the time the access policy is enforced. How the particular extension is implemented would be a routine function of the computer operating system and thus will not be described here. The enforcement or non-enforcement of separation of duties is defined within the security policy 38 for the relevant transaction 35a, for example, i.e., the policy statement 38 indicates that alias detection is to be invoked. The security policy 38 requires that the right to execute approve_expns_rpt program 35a is to be denied if the identity of the originator, or first user, is the same as the identity of the second user, i.e., the user seeking to approve the expense report in this example. This comparison was described previously in reference to FIG. 3.

Associated with each transaction invocation by a user is that user's validation credential (44, 45, and 47 in FIG. 4), which identifies the user who initiated the transaction. A validation credential is an integrity-sealed unit of processing created by the operating system that links a user's account certificate, as described in FIG. 2, to a requested application. Upon transaction invocation, the user's validation credential is stored in protected system memory 46 of Processing Unit X 49 and in name service database 30 of name server system 48, which contains proof of identity of the user on whose behalf a particular unit of processing executes. In this embodiment of the invention, the unit of processing is the transaction invocation. The association of the individual's validation credential with the transaction invocation is a function present in the operating system or transaction processing monitor which provides the operational platform for the example application.

Continuing with the description of FIG. 4, a first user logs on the name service database 30 under account UserA. UserA remote validation credential 44 (including certificate based alias detection data) is entered by the operating system in protected system memory 46 of Processing Unit X 49. UserA, wishing to produce an expense report, requests execution of a create_expns_rpt program 35b, which is loaded from application server system 50. A create_expns_rpt ACL 40b, which has previously been created or modified to name the account certificate or certificates of the user accounts authorized to execute create_expns_rpt program 35b, is used to obtain the public keys for those accounts, which are then used to validate the remote delegation certificate. If the remote certificate can be validated, the request is then honored, causing execution of the create_expns_rpt program 35b by Processing Unit X 49 and an expense report file is produced. UserA now attempts to execute a submit_expns_rpt program 35c which is loaded from application server 50. A submit_expns_rpt ACL 40c, which has previously been created or modified to indicate the user account or accounts authorized to execute submit_expns_rpt 35c program, is checked against UserA remote validation credential 44.

A match between the UserA validation credential 44 and a user's account in the ACL 40c causes execution of the submit_expns_rpt program 35c by Processing Unit X 49 which signs the expense report file by appending UserA certificate 33a and certificate-based alias detection data (to be described more fully below). The expense report file is posted to an expense_report queue 62 on queue server 60.

Subsequent to these transactions by UserA 33a, a second user, wishing to review and approve the expense report file created by UserA, logs in under account UserB. UserB remote delegation certificate 45 (including certificate based alias detection data) is entered by the operating system in protected system memory 46 of processing unit X 49. UserB requests execution of a review_expns_rpt program 35d, which is loaded from application server 50. A review_expns_rpt ACL 40d, which has previously been created or modified to indicate the user account or accounts authorized to execute review_expns_rpt program 35d, is checked against UserB remote validation credential 45. A match between the UserB remote validation credential 45 and a user's account in the ACL 40d causes execution of the review_expns_rpt program 35d by Processing Unit X 49 which produces the expense report file for UserB to read/review, for example, on a video display device.

UserB now attempts to execute approve_expns_rpt program 35a to approve the expense report created by UserA. The digital signature on the expense report (which is that of the application server system 116) is first validated to ensure that no changes have been made to the report or to the account certificate associated with it. The account certificate (which is signed by the registrar) can, but need not be revalidated. It contains the CBAD data for the user that created the report, viz., UserA. The application server system 116 now has two validated sets of CBAD data, one for UserA and one for UserB. These two sets of CBAD data are then compared for similarity. If the alias detection check fails, the digitized biometric data are regarded as identifying the same user, i.e., the application server system 116 must assume that UserA and UserB are, in fact, the same individual (even though the corresponding account certificates belonged to distinct accounts registered potentially to different user names). If the certificate-based alias detection check indicates that UserA and UserB are the same, access to the approve_expns_rpt program 35a is denied to UserB, and a report can be made for notification to the system manager or registrar.

The expense report example has shown how the present embodiment satisfies a separation of duties policy that disallowed one and the same unique individual from creating and approving an expense report. Rather than insuring that UserA and UserB had distinct identities when their user accounts were first created, the present embodiment utilized a comparison of certificate based alias detection data of each of the users at the actual time a request for expense report approval was made. Validation of the user's personal information only had to be done when the user account was created initially or modified by the system administrator.

Having described a preferred embodiment of the invention, it will now become apparent to one of skill in the art that other embodiments incorporating its concepts may be used. It is felt, therefore, that this embodiment should not be limited to the disclosed embodiment, but rather should be limited only by the spirit and scope of the appended claims.

What is claimed is:

1. A method of operating a distributed computer system having alias detection, comprising the steps of:

A) storing, in a user account store of said computer system, identification information associated with each of a plurality of user accounts, said identification information for each said user account uniquely characterizing a computer user associated with said account;

B) storing a list of selected ones of said user accounts in an authorization store;

C) after steps (A) and (B), initiating execution of a computer system resources access program in response to a request on behalf of a first of said user accounts; and D) after step (C), processing said request from said first user account for authorizing access to a computer system resource by performing the steps of
   i) comparing said identification information stored in said user account store in association with said first user account and identification information associated with each of said user accounts of said list of selected user accounts, and
   ii) executing said computer system access program if said compared identification information do not match, thereby indicating that said first user account is not an alias of any of said selected user accounts.

2. A method in accordance with claim 1, wherein said identification information for each said user account includes authenticating information, digitized biometric information, and user account information.

3. A method in accordance with claim 2, further comprising the step of:

an account registrar verifying said digitized biometric information prior to a representation of said digitized biometric information being stored in a said user account store.

4. A method in accordance with claim 2, further including the step of creating said user accounts, and said accounts creation step includes said account registrar verifying step.

5. A method in accordance with claim 2, further comprising the step of:

an account registrar digitally signing said digitized biometric information and said authenticating information and said user account information prior to said digitally signed information being stored in said user account store.

6. A method in accordance with claim 1, wherein said step of initiating execution of a computer systems access program comprises the steps of:

E) comparing a validation credential linking said access program to user certificates of said selected user accounts in said authorization store to determine whether said user account is authorized to execute said access program; and F) allowing said user account to execute said access program if authorized to do so.

7. A method in accordance with claim 1, wherein said executing step includes the step of permitting access to said computer resource if said compared identification information do not match.

8. A method in accordance with claim 1, wherein said processing step further comprises the step of:

denying said request if said compared identification information match, thereby indicating that said first user account is an alias of at least one of said selected user accounts.

9. A method in accordance with claim 1, wherein said processing step further comprises the step of:

denying said request on the occurrence of any of the following events: i) said user account is the same as one of said selected user accounts, ii) said user account has no associated identification information in said user account store, and iii) said user account's identification information in said user account store is the same as one of said selected user account's identification information.

10. A method of operating a distributed computer system having alias detection, comprising the steps of:

A) storing, in respective user accounts a user account store of said computer system identification information associated with each of a plurality of user accounts, said identification information for each said user account uniquely characterizing a computer user associated with said account;

B) in response to a first request from a first user account, initiating execution of a stage of a selected transaction program having a plurality of stages; and C) processing a second request from a second user account for authorization of execution of a subsequent stage of said selected transaction program by performing the steps of i) comparing said identification information stored in said user account store for said first user account and said identification information stored in said user account store for said second user account, and ii) denying authorization to said second user account if said compared identification information do match, thereby indicating that said second user account is an alias of said first user account.

11. A method in accordance with claim 10, wherein said identification information for each user account contains a digitally-signed account certificate.

12. A method in accordance with claim 11, wherein said digitally-signed account certificate includes authenticating information, digitized biometric information, and user account information.

13. A method in accordance with claim 12, further including the step of:

an account registrar verifying said digitized biometric information prior to said digitized biometric information being stored in said user account store.

14. A method in accordance with claim 12, further comprising the step of:

an account registrar digitally signing said digitized biometric information, said authenticating information and said user account information prior to said digitized biometric information, said authenticating information and said user account information being stored in said user account.

15. A method in accordance with claim 10, wherein said step of initiating a stage of a transaction program comprises the steps of:

D) comparing a validation credential linking said transaction program to user certificates of accounts authorized to execute selected transactions of said transaction program, with a list of authorized user accounts to determine whether said first user account is authorized to execute said first stage of said selected transaction program; and E) allowing said first user account to initiate execution of said first stage only if authorized to do so.

16. A method according to claim 10, wherein during said processing step, said request is allowed to execute said subsequent stage of said selected transaction program if said second user account is not an alias of said first user account.

17. A method in accordance with claim 10, wherein said processing step further comprises the step of:

if said first user account is the same as said second user account, or if said second user account contains has no associated identification information in said user account store, or if said second user account's identification information is the same as said first user account's identification information, denying authorization to said second request.

18. A distributed computer system having alias detection, comprising:

A) a registry store of respective user accounts, said accounts containing identification information uniquely characterizing each of a plurality of computer users;

B) a stored application transaction program having at least two stages requiring separate initiation requests for execution of said stages;

C) means, responsive to a first user account transaction initiation request, for executing one stage of said application program;

D) means, responsive to an approval of a second user account transaction initiation request, for executing a subsequent stage of said application program; and E) means for comparing identification information of said first and second user accounts in said store and providing said approval if said compared identification information do not match, thereby indicating that said second user account is not an alias of said first user account.

19. A system in accordance with claim 18, further comprising an account registrar for digitally signing an account certificate included in said identification information for each said user account.

20. A system accordance with claim 19, wherein said digitally signed account certificate includes authenticating information and digitized biometric information and account information.

21. A system in accordance with claim 20, wherein said account registrar verifies said digitized biometric information prior to said digitized biometric information being stored in said user account.

22. A system accordance with claim 21, wherein said account registrar digitally signs said digitized biometric information, said authenticating information and said user account information prior to said information being stored in said user account.

23. A system accordance with claim 18, wherein said means responsive to said first request comprises:
- F) means for extracting a delegation certificate from a digitally signed delegation certificate that associates said first request with a logan delegation certificate of said first user account;
- G) means for verifying said delegation certificate against a list of names of accounts to determine whether said delegation certificate was generated on behalf of one of said accounts appearing on said list and is therefore authorized to execute said first stage of said selected transaction program; and
- H) means for allowing said first user account to initiate execution of said first stage only if authorized to do so.

24. A system in accordance with claim 18, wherein said means for comparing comprises: means for terminating said second request in the event said first user account is the same as said second user account, said second user account contains no identification information, or said second user account's identification information is the same as said first use account's identification information.

25. A distributed computer system for implementing alias detection, comprising:
- A) a store for a plurality of user accounts, said accounts containing digitally-signed account certificates including authentication information, digitized biometric information, and user account information uniquely characterizing, for each said user account, one of a plurality of computer users;
- B) a stored application transaction program having at least two stages requiring separate initiation requests for execution of said stages;
- C) means, responsive to a first user account transaction initiation request, for executing a first stage of said at least one application program; and
- D) means, responsive to a second user account transaction initiation request to execute a subsequent stage of said at least one application program, for comparing said authentication information and said digitized biometric information contained in said user certificate of said first and second user accounts in said store; and
- E) means for allowing execution of said subsequent stage of said at least one application program only if said compared authentication information and digitized biometric information do not match, and thus only if said second user account is not an alias of said first user account.

26. A system in accordance with claim 25, wherein said digitized biometric information together with said authenticating information and said user account information is digitally-signed by an account registrar.

27. A system in accordance with claim 25, wherein said means for comparing comprises:
- means for denying said second request if said first user account is the same as said second user account, or if said second user account contains no digitized biometric information, or if said second user account's identification information is the same as said first user account's identification information.

* * * * *